(12) United States Patent
Lee et al.

(10) Patent No.: US 10,616,039 B2
(45) Date of Patent: Apr. 7, 2020

(54) SYSTEM AND METHOD FOR REMOTE MAINTENANCE

(71) Applicant: DASAN Zhone Solutions, Inc., Oakland, CA (US)

(72) Inventors: Seung Dong Lee, Oakland, CA (US); Il Yung Kim, Oakland, CA (US); Kyeong Baek Kim, Oakland, CA (US)

(73) Assignee: DASAN Zhone Solutions, Inc., Oakland, CA (US)

( * ) Notice: Subject to any disclaimer, the term of this patent is extended or adjusted under 35 U.S.C. 154(b) by 1 day.

(21) Appl. No.: 15/714,586

(22) Filed: Sep. 25, 2017

(65) Prior Publication Data
US 2019/0097872 A1    Mar. 28, 2019

(51) Int. Cl.
*H04L 12/24* (2006.01)
*H04L 12/26* (2006.01)
(Continued)

(52) U.S. Cl.
CPC ........ *H04L 41/0631* (2013.01); *H04L 41/046* (2013.01); *H04L 41/24* (2013.01);
(Continued)

(58) Field of Classification Search
CPC ... H04L 41/0631; H04L 41/24; H04L 41/046; H04L 43/50; H04W 4/80; H04W 8/02
See application file for complete search history.

(56) References Cited

U.S. PATENT DOCUMENTS

2006/0126495 A1* 6/2006 Guichard ............ H04L 41/0677
                                                                370/216
2010/0150170 A1* 6/2010 Lee ..................... H04L 41/0213
                                                                370/466
(Continued)

FOREIGN PATENT DOCUMENTS

JP   2002-092206 A   3/2002
JP   2005-202597 A   7/2005
(Continued)

OTHER PUBLICATIONS

Korean Office Action dated Feb. 28, 2019 in counterpart Korean Patent Application No. 10-2017-0131702 (5 pages in Korean).
(Continued)

*Primary Examiner* — Ivan O Latorre
(74) *Attorney, Agent, or Firm* — NSIP Law

(57) ABSTRACT

Disclosed is a technology for a maintenance system. The maintenance system includes a customer-premises equipment (CPE), a smart device configured to connect to the CPE through short-range wireless communication, and a maintenance service server configured to communicate with the smart device. The maintenance system provides a remote maintenance service capable of resolving a failure by ordering an appropriate action through execution of a maintenance service app installed on the smart device according to a failure cause and analysis of collected state information according to a diagnosis instruction corresponding to a diagnosis scenario; resolving a failure by receiving action information from the maintenance service server, which
(Continued)

stores action information for pre-resolved failure items; resolving a failure by receiving a help from a maintenance specialist; or remotely resolving a failure without an onsite visit of a maintenance specialist by providing a means for debugging the CPE through a remote console connection.

8 Claims, 8 Drawing Sheets

(51) Int. Cl.
    *H04W 8/02*     (2009.01)
    *H04W 4/80*     (2018.01)

(52) U.S. Cl.
    CPC ............... *H04L 43/50* (2013.01); *H04W 4/80* (2018.02); *H04W 8/02* (2013.01)

(56) References Cited

U.S. PATENT DOCUMENTS

| | | | |
|---|---|---|---|
| 2013/0101071 A1* | 4/2013 | Salinger | H04N 19/80 375/320 |
| 2016/0209074 A1* | 7/2016 | Ito | F24F 11/30 |
| 2017/0111859 A1* | 4/2017 | Sakai | H04W 52/0212 |

FOREIGN PATENT DOCUMENTS

| | | |
|---|---|---|
| KR | 10-2004-0110400 A | 12/2004 |
| KR | 10-2009-0034433 A | 4/2009 |
| KR | 10-2012-007211 A | 1/2012 |
| WO | WO 2015/037333 A1 | 3/2015 |

OTHER PUBLICATIONS

Korean Notice of Allowance dated Nov. 28, 2019 in counterpart Korean Patent Application No. 10-2017-0131702 (2 pages in Korean).

* cited by examiner

SYSTEM AND METHOD FOR REMOTE MAINTENANCE

BACKGROUND

1. Field

The present invention relates to a system and method for remote maintenance, and more particularly, to a system and method for remotely maintaining a customer-premises equipment (CPE) by means of a mobile communication network.

2. Discussion of Related Art

In a conventional maintenance service, when a customer cannot connect to the Internet due to a failure of a customer-premises network device, the customer makes contact with an Internet service provider or an Internet maintenance company to report a fault, and an operator of the Internet service provider or the Internet maintenance company tries to recover the device by ordering a simple action, that is, an action of resetting the device via a phone. When the device is not recovered, the operator orders a maintenance specialist to move to a place where the customer device is located, and the maintenance specialist moves to the place, checks the customer device, and repairs the customer device.

SUMMARY

The present invention is directed to providing a solution capable of diagnosing and resolving a failure having occurred in a CPE by utilizing an application installed on a customer's smart device when the failure may be resolved by a simple action.

Furthermore, the present invention is directed to providing a solution capable of remotely resolving a failure having occurred in a CPE without an onsite visit of a maintenance specialist by utilizing an application installed on a customer's smart device connected to a reliable mobile communication network.

Furthermore, the present invention is directed to providing a solution capable of settling costs with an Internet service provider with which a maintenance contract is made by enabling a server for providing a maintenance service to collect failure history and failure processing history on a customer basis.

According to an aspect, a remote maintenance system using a mobile communication network includes a customer-premises equipment (CPE), a smart device, and a maintenance service server.

The CPE and the smart device are connected through short-range wireless communication, and the smart device and the maintenance service server are connected through the Internet over a mobile communication network.

According to an aspect, the CPE includes a network service provision unit, a terminal connection unit, a device diagnosis unit, and a console emulation unit.

According to an aspect, the smart device includes a device connection unit, a diagnosis information storage unit, a diagnosis instruction unit, a state analysis unit, a failure processing unit, a server connection unit, and a history transmission unit.

According to an aspect, the maintenance service server includes a terminal connection unit, a customer management unit, a history management unit, and a billing unit.

According to an aspect, in the remote maintenance system using a mobile communication network, the smart device analyzes collected state information according to a diagnosis scenario, processes a failure, and transmits a failure processing history to the maintenance service server when the failure has occurred in the CPE.

According to another aspect, the smart device may further include a data collection unit, and the maintenance service server may further include a troubleshooting database (DB), a cause analysis unit, and an action search unit.

According to this aspect, in the remote maintenance system using a mobile communication network, the smart device may receive failure action information from the maintenance service server and may instruct the CPE to take a failure action according to the failure action information.

According to another aspect, the maintenance service server may further include a technical support request unit and an action information update unit and may transmit the failure action information to the smart device.

According to another aspect, the smart device may further include a console connection relay unit, and the maintenance service server may further include a debug request unit and a console connection unit.

According to another aspect, the smart device may further include a notification unit and may issue a notification about a console connection.

According to another aspect, the maintenance service server may further include a diagnosis scenario creation unit, and the smart device may further include a diagnosis information update unit and may update a diagnosis scenario.

According to an aspect, a remote maintenance method that is used by the remote maintenance system to resolve a failure having occurred in the CPE includes a device connection operation of the smart device, a diagnosis instruction operation of the smart device, a state information transmission operation of the CPE, a state analysis operation of the smart device, an action instruction operation of the smart device, a history transmission operation of the smart device, and a history management operation of the maintenance service server.

According to another aspect, the remote maintenance method may further include, before the action instruction operation of the smart device is carried out when a failure cause cannot be analyzed from the state information from the state analysis operation of the smart device: a data collection operation of the smart device, a data transmission operation of the smart device, a cause analysis operation of the maintenance service server, an action search operation of the maintenance service server, and an action transmission operation of the maintenance service server.

According to another aspect, the remote maintenance method may further include, before the action transmission operation of the maintenance service server is carried out when a failure cause cannot be analyzed from the cause analysis operation of the maintenance service server or when failure action information is not found in the action search operation of the maintenance service server: a technical support request operation of the maintenance service server and a DB update operation of the maintenance service server.

According to another aspect, the remote maintenance method may further include, before the DB update operation of the maintenance service server is carried out when a failure cause cannot be analyzed by the maintenance specialist: a debug request operation of the maintenance service server, a console connection operation of the maintenance service server, a console connection relay operation of the smart device, and a console emulation operation of the CPE.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above or other aspects will be implemented through embodiments described with reference to the accompanying drawings. It is to be understood that the components of each embodiment may be variously combined therein unless otherwise stated or mutually contradictory. In some cases, each block of a block diagram may represent a physical component. In other cases, each block may logically represent a partial function of a single physical component or a common function of a plurality of physical components. Sometimes, a block or a part thereof may be a set of program instructions. All or some of the blocks may be implemented in hardware, software, or a combination thereof.

Figure 1:
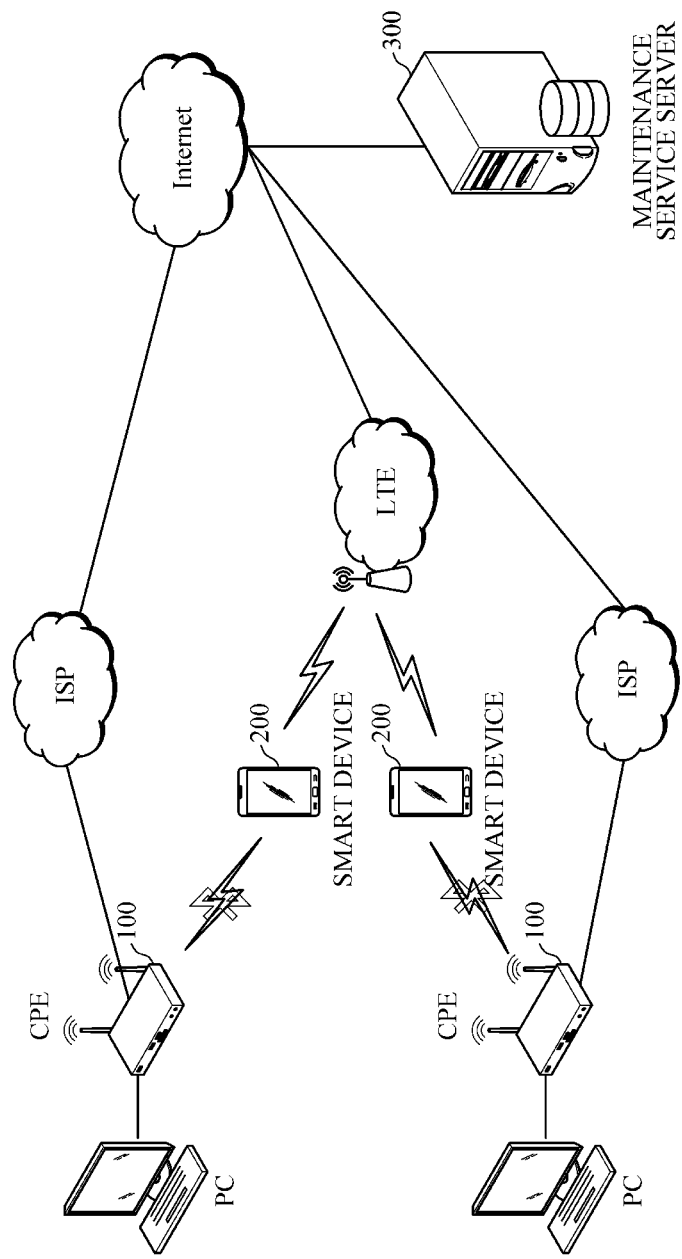
FIG. 1 is a diagram showing a configuration of an element for remotely providing a maintenance service according to an embodiment.

FIG. 1 is a diagram showing a configuration of a remote maintenance system according to an embodiment. According to an aspect, the remote maintenance system includes a customer-premises equipment (CPE) 100, a smart device 200, and a maintenance service server 300.

The CPE 100 according to an aspect includes a network service provision unit 120, a terminal connection unit 140, a device diagnosis unit 160, and a console emulation unit 180.

Typically, the CPE 100 is a network device installed in a customer's premises and connected to an end point of an Internet service provider and includes a router, a switch, a residential gateway, a set-top box, a home networking adaptor, an Internet access gateway, etc.

The network service provision unit 120 is connected to a service of an Internet service provider and configured to provide a home Internet service. That is, the network service provision unit 120 is connected to a service of an Internet service provider through ADSL lines, optical lines, dedicated lines, CATV lines, or the like and enables a user to use the Internet service through a LAN at home.

The terminal connection unit 140 connects to the smart device 200 through short-range wireless communication. The terminal connection unit 140 includes a short-range wireless communication module. In this case, the short-range wireless communication may be Bluetooth, WiFi, or the like, but is not limited thereto. Bluetooth, and WiFi are well-known technologies, and thus detailed descriptions thereof will be omitted.

The terminal connection unit 140 is used for a remote maintenance service when a home Internet service is not smooth due to a failure of the CPE 100. The terminal connection unit 140 is connected when a connection request from the smart device 200 is accepted. Also, after the connection, data is transmitted or received to or from the smart device 200 through the terminal connection unit 140.

The device diagnosis unit 160 applies a diagnosis signal or checks an internal resource state depending on diagnosis instruction information corresponding to a diagnosis scenario received from the smart device 200. Various kinds of state information of the CPE 100 collected after the diagnosis signal is applied or after the internal resource state is checked is transmitted through the terminal connection unit 140 to the smart device 200 that has transmitted the diagnosis instruction information.

The console emulation unit 180 remotely provides a console connection to a console connection program at a remote site through the smart device 200. Generally, a network device such as the CPE 100 may have a console connection port through which an internal resource state of the device may be directly checked. The console emulation unit 180 emulates a console connection to enable the console connection to be remotely made although the console connection is not directly made with the CPE 100. That is, the console emulation unit 180 may be in console connection with the CPE 100 through the smart device 200 of the client through a console connection program in a remote site.

The device diagnosis unit 160 and the console emulation unit 180 may be application software implemented as a set of program instructions or software implemented in the form of firmware.

The smart device 200 according to an aspect includes a device connection unit 210, a diagnosis information storage unit 215, a diagnosis instruction unit 220, a state analysis unit 225, a failure processing unit 230, a server connection unit 235, and a history transmission unit 240. In this case, the smart device 200 is a terminal connected to a mobile communication network and may include a smartphone, a tablet computer, or the like.

The device connection unit 210, the diagnosis information storage unit 215, the diagnosis instruction unit 220, the state analysis unit 225, the failure processing unit 230, the server connection unit 235, and the history transmission unit 240 may be implemented with an application running on a smart device and may be implemented as a single application or several individual applications.

The smart device includes a memory for storing the applications and a processor for executing the applications.

The device connection unit 210 may connect to the CPE 100 through short-distance wireless communication. The device connection unit 210 includes a short-range wireless communication module. In this case, the short-range wireless communication may be Bluetooth, WiFi, or the like, but is not limited thereto.

When a home Internet service is not steady due to a failure of the CPE 100, the device connection unit 210 transmits a connection request to the CPE 100. When a customer who has recognized a failure executes a maintenance service application installed on his or her smartphone, the device connection unit 210 automatically requests a connection. Also, after the connection, transmission and reception of data to and from the CPE 100 are performed through the device connection unit 210.

The diagnosis information storage unit 215 stores a diagnosis scenario composed of sequential pieces of diagnosis instruction information including an instruction to apply a diagnosis signal for a series of diagnosis items by type of CPE 100 or an instruction to collect state information regarding resources of the CPE 100. The diagnosis scenario is composed of processes of performing diagnosis to determine whether well-known failure items have occurred and collecting state information.

According to another aspect, the diagnosis information storage unit 215 may download an updated diagnosis scenario from the maintenance service server 300 by adding a failure item and a diagnosis method and may store the downloaded diagnosis scenario.

The diagnosis instruction unit 220 transmits sequential pieces of diagnosis instruction information to the device diagnosis unit 160 according to a diagnosis scenario corresponding to the CPE 100 and collects state information corresponding to a diagnosis result. The diagnosis instruction unit 220 is configured to collect state information in order to understand the type of failure that has occurred in the CPE 100. The diagnosis instruction unit 220 is configured to perform checks according to a diagnosis scenario stored in the smart device 200 of the customer and receive and store state information collected as a result of the check.

The state analysis unit 225 analyzes a cause of the failure by using the state information collected from the CPE 100. The collected state information is regarding a state of internal resources of the CPE 100. As an example, when a traffic throughput is collected for each port of the CPE 100 and a specific port generates abnormal traffic, the state analysis unit 225 may analyze excessive traffic use of the specific port as the failure cause.

The failure processing unit 230 instructs the CPE 100 to take a failure action corresponding to the failure cause analyzed by the state analysis unit 225. The failure processing unit 230 stores action information for solving failures for each known failure cause. The failure causes and the action information for each failure cause that are stored in the failure processing unit 230 are updated by the maintenance service server 300. The failure processing unit 230 receives and stores the updated information.

The server connection unit 235 connects to the maintenance service server 300 over a mobile communication network. The mobile communication network may be a 3G network, a 4G LTE network, a 4G LTE-A network, a 5G network, or the like. Although the server cannot access an external network through an ISP because of the failure of the CPE 100, the server connection unit 235 may perform the connection by using a mobile communication network with high reliability. According to another aspect, the CPE 100 may perform WiFi connection at home even when a failure has occurred in the CPE 100. In this case, in order to use a remote maintenance service, a notice will be displayed on the smart device 200 to set the smart device 200 not to use WiFi. Also, after the connection, transmission and reception of data to and from the maintenance service server 300 are performed through the server connection unit 235.

The history transmission unit 240 transmits a failure history and a failure processing history to the maintenance service server 300. The transmitted failure history and failure processing history are stored in the maintenance service server 300 in order to settle costs with an Internet service provider or a maintenance company. Also, the transmitted histories are used for the maintenance service server 300 to update a diagnosis scenario and to add and update failure items and failure action information.

The maintenance service server 300 according to an aspect includes a terminal connection unit 310, a customer management unit 315, a history management unit 320, and a billing unit 325. In the shown system, the maintenance service server 300 is represented as one server and one database, but may be composed of a plurality of servers that are physically separated from each other and connected over a network or may be composed of a plurality of physical servers to which functions of the maintenance service server 300 are distributed. Also, the maintenance service server 300 may be executed using some resources of a cloud server. Also, the database may be implemented with a plurality of databases. The database may be implemented in the same space or system as that of the server and may be implemented as a storage connected through a network.

The terminal connection unit 310 connects to the smart device 200. Since the smart device 200 has requested a connection through a mobile communication network, the connection is made via the mobile communication network. After the connection, transmission and reception of data to and from the smart device 200 are performed through the terminal connection unit 310.

The customer management unit 315 manages customer information including information regarding a subscribed Internet service provider and the CPE 100. The customer information is managed to calculate data such as statistics needed to operate the maintenance service server 300 and generate billing information.

The history management unit 320 stores and manages a failure history and a failure processing history that are received from the smart device 200 on a customer basis. The history management unit 320 collects a failure history and a failure processing history on a customer basis and stores the collected failure history and failure processing history to settle costs. According to another aspect, when a new failure item, which is not included in the stored diagnosis scenario, is received and it is possible to process failure action information through the smart device 200, the diagnosis scenario is updated by the failure item and the failure action information added thereto.

The billing unit 325 calculates a cost according to the failure processing history. The cost is calculated according to a contract with an Internet service provider or a maintenance company.

According to an aspect, when a customer detects a failure of the CPE 100 and connects to the CPE 100 by means of his or her smart device 200, the remote maintenance system of the CPE 100 analyzes state information collected according to the diagnosis scenario stored in the smart device 200, processes the failure, and transmits a failure processing history to the maintenance service server 300.

As an example, when a failure has occurred in a home Internet service because a personal computer (PC) of a customer is infected by a virus and generates a large amount of traffic, the customer executes a maintenance service app installed on his or her smartphone to connect to the CPE 100 through short-range wireless communication, select a stored diagnosis scenario corresponding to the CPE 100, which is installed at home, sequentially transmit diagnosis instruction information to the CPE 100, and collect state information.

The customer finds, from a port-based traffic amount included in the collected state information, that a specific port connected to the PC of the customer operates abnormally and instructs the CPE 100 to block the specific port according to action information stored as a solution for this failure item.

Then, the CPE 100 blocks the specific port according to the instruction of the smart device 200 to block the specific port. As a result, the home Internet service is recovered. The smart device 200 reports a failure history and a failure processing history about the resolved failure to the maintenance service server 300.

According to another aspect, the smart device 200 may further include a data collection unit 245, and the maintenance service server 300 may further include a troubleshooting database (DB) 340, a cause analysis unit 330, and an action search unit 335.

The data collection unit 245 of the smart device 200 may also be implemented with an application.

When a failure cause cannot be analyzed using only the collected state information being analyzed by the state analysis unit 225, the data collection unit 245 of the smart device 200 may request and collect device data including at least log information and/or packet capture information, which are used for the maintenance service server 300 to analyze a failure, from the CPE 100.

The collected log information is information in which events having occurred in the CPE 100 are stored together with time information, and the collected packet capture information is information in which any packet including Internet Control Message Protocol (ICMP) messages processed by any port or a specific port is collected.

The troubleshooting DB 340 of the maintenance service server 300 stores a failure cause and failure action information corresponding thereto. The troubleshooting DB 340 collects troubleshooting information by type and corresponds to a database in which a failure cause and failure action information capable of resolving a failure are stored according to failure type.

The cause analysis unit 330 of the maintenance service server 300 analyzes a failure cause by using the collected device data. The collected log information and packet capture information, as well as the state information, are used in the analysis in order to find a failure cause that has not been found through the state information analysis performed by the smart device 200.

The action search unit 335 of the maintenance service server 300 searches the troubleshooting DB 340 for failure action information by using the analyzed failure cause. In this case, the failure action information is transmitted to the smart device 200 through the terminal connection unit 310 so that the smart device 200 may resolve the failure of the CPE 100.

In this case, the failure processing unit 230 of the smart device 200 receives the failure action information from the maintenance service server 300, instructs the CPE 100 to take a failure action according to the received failure action information to resolve the failure, and transmits a failure history and a failure processing history to the maintenance service server 300 through the history transmission unit 240.

As another example, when an Internet service connection does not work because the Internet protocol (IP) address of the CPE 100 that is automatically allocated through the Dynamic Host Configuration Protocol (DHCP) is different from the IP address stored in a router, a customer executes a maintenance service app installed on his or her smartphone to connect to the CPE 100 through short-range wireless communication, select a stored diagnosis scenario corresponding to the CPE 100, which is installed at home, sequentially transmit diagnosis instruction information to the CPE 100, and collect state information.

When a failure cause cannot be found although the collected state information is analyzed, the smart device 200 requests and collects device data including log information or the like from the CPE 100. The smart device 200 transmits the collected device data to the maintenance service server 300 in addition to the state information that has already been collected.

The maintenance service server 300 analyzes the transmitted state information and device data to find that the IP address set for the CPE 100 is different from the IP address stored in the router and searches the troubleshooting DB 340 for action information by using the difference as a failure cause. The found action information is transmitted to the smart device 200. As a solution for this problem, the smart device 200 instructs the CPE 100 to restart a DHCP client and receive a new IP address.

The CPE 100 restarts the DHCP client and receives the same IP address as that stored in the router. As a result, the home Internet service is recovered. The smart device 200 reports a failure history and a failure processing history about the resolved failure to the maintenance service server 300.

According to another aspect, the maintenance service server 300 may further include a technical support request unit 345 and an action information update unit 350.

When the cause analysis unit 330 cannot analyze a failure cause or when failure action information for the analyzed failure cause is not found in the troubleshooting DB 340, the technical support request unit 345 of the maintenance service server 300 reports the received device data to a maintenance specialist and requests technical support from the maintenance specialist. The failure of the CPE 100 cannot be resolved by just any action since technical support is being requested from the maintenance specialist. When the failure of the CPE 100 cannot be resolved by just any action, the maintenance specialist may solve a problem in an external device and notify a user terminal of only a result of the action addressing the problem.

The action information update unit 350 receives a failure cause analyzed by the maintenance specialist and failure action information and updates the troubleshooting DB 340. Only when it is possible to resolve the failure through the CPE 100 may the failure cause and the failure action information be updated.

Only in this case, the action information is transmitted to the smart device 200. In other cases, the user terminal is notified of only a result of the action addressing the failure.

As another example, when an Internet service is only partially provided, a customer executes a maintenance service app installed on his or her smartphone to connect to the CPE 100 through short-range wireless communication, select a stored diagnosis scenario corresponding to the CPE 100, which is installed at home, sequentially transmit diagnosis instruction information to the CPE 100, and collect state information.

When a failure cause cannot be found although the collected state information is analyzed, the smart device 200 requests and collects device data including log information or the like from the CPE 100. The smart device 200 transmits the collected device data to the maintenance service server 300 in addition to the state information that has already been collected.

The maintenance service server 300 analyzes the received state information and device data. However, when a failure cause is not found, the maintenance service server 300 requests a technical support from a maintenance specialist. In this case, the maintenance specialist may receive the state information and the device data from the maintenance service server 300. In some cases, the maintenance specialist may connect to the maintenance service server 300 to directly read information regarding a corresponding case.

The maintenance specialist finds that a service mapping, which is one of GEM (GPON Encapsulation Method) port elements of an optical network terminal (ONT), is missing from an operator's database, modifies a portion missing from the operator's database, takes an action so that the portion modified by the ONT may be downloaded, and notifies the maintenance service server 300 of the failure resolution.

The maintenance service server 300 takes no action directly for the CPE 100 and thus notifies the smart device 200 of the customer that the failure is recovered without updating the troubleshooting DB 340.

The smart device 200 reports a failure history and a failure processing history about the resolved failure to the maintenance service server 300.

According to another aspect, the smart device 200 may further include a console connection relay unit 250, and the maintenance service server 300 may further include a debug request unit 355 and a console connection unit 360.

The console connection relay unit 250 of the smart device 200 is also implemented with an application.

When a console connection is requested from a console connection program at a remote site, the console connection relay unit 250 of the smart device 200 relays the console connection to the CPE 100. The console connection is relayed to provide the same function as a remote console connection without need to directly go to the spot and perform a console connection to a console port of the device. Since there is no way to remotely and directly connect to the CPE 100 due to a failure having occurred in the CPE 100, the console connection relay unit 250 of the smart device 200 relays the console connection through a reliable mobile communication network.

The debug request unit 355 of the maintenance service server 300 delivers the received device data to a developer of the CPE 100 and requests that the developer debug the CPE 100 when the failure is not resolved even by the maintenance specialist. The developer may find the failure cause by analyzing the device data, and thus the remote console connection may be unnecessary.

When the developer does not find the failure cause through only the device data analysis and requests a console connection, the console connection unit 360 of the maintenance service server 300 requests the console connection from the smart device 200. The console connection relay unit 250 of the smart device 200 may relay the console connection to the console emulation unit 180 of the CPE 100 so that a console connection program at a remote site, that is, terminal emulator software, may operate as if directly connected to a console.

After a remote console connection, the developer may utilize his or her own debugging tool to find a failure cause of the CPE 100 and a corresponding solution. The developer delivers the found failure cause and corresponding action information to the maintenance service server 300 so that the maintenance service server 300 may update the action information.

As another example, when a failure has occurred in an Internet service because of a firmware bug on the CPE 100, a customer executes a maintenance service app installed on his or her smartphone to connect to the CPE 100 through short-range wireless communication, select a stored diagnosis scenario corresponding to the CPE 100, which is installed at home, sequentially transmit diagnosis instruction information to the CPE 100, and collect state information.

When a failure cause cannot be found although the collected state information is analyzed, the smart device 200 requests and collects device data including log information or the like from the CPE 100. The smart device 200 transmits the collected device data to the maintenance service server 300 in addition to the state information that has already been collected.

The maintenance service server 300 analyzes the received state information and device data. However, when a failure cause is not found, the maintenance service server 300 requests a technical support from a maintenance specialist. In this case, the maintenance specialist may receive the state information and the device data from the maintenance service server 300. In some cases, the maintenance specialist may connect to the maintenance service server 300 to directly read information regarding a corresponding case.

When a failure cause is not found even through the analysis of the maintenance specialist, the maintenance service server 300 may request that a developer of the CPE 100 debug the CPE 100. When the debug is requested, the developer may analyze the device data received from the maintenance service server 300. If necessary, the developer may remotely request a console connection from the CPE 100. Thus, the remote console connection to the CPE 100 via the maintenance service server 300 and the smart device 200 of the customer is emulated through a console connection program of the developer.

The developer may debug the CPE 100 by utilizing his or her own debugging tool. The developer finds that the failure cause is a bug in firmware, prepares so that the CPE 100 may install modified firmware, and then transmits the failure cause and failure action information to the maintenance service server 300.

The maintenance service server 300 updates the troubleshooting DB 340 with the failure cause and the action information and transmits action information for resolving the failure to the smart device 200. When the action information is received, the smart device 200 instructs the CPE 100 to download and install new firmware through the smart device 200 of the customer.

Thus, when the failure is recovered, the smart device 200 reports a failure history and a failure processing history about the recovered failure to the maintenance service server 300.

According to another aspect, the smart device 200 may further include a notification unit 255. The notification unit 255 of the smart device 200 may also be implemented with an application. The notification unit 255 of the smart device 200 displays a notification message indicating that a remote console connection is being made when the console connection is relayed to the CPE 100.

When a developer is performing a remote console connection to the CPE 100 in order to resolve a failure, the notification unit 255 displays a notification message so that a customer does not block the connection between the smart device 200 and the CPE 100.

According to an additional aspect, even when a failure is resolved although the smart device 200 does not instruct the CPE 100 to take an action, the notification unit 255 may issue a notification indicating that the failure is resolved. Also, in some cases, when a device installed at home other than the CPE 100 connected to the customer is instructed to take an action, the notification unit 255 may issue a notification.

According to another aspect, the maintenance service server 300 may further include a diagnosis scenario creation unit 365. The created diagnosis scenario is transmitted to and stored in the smart device 200.

The diagnosis scenario creation unit 365 of the maintenance service server 300 creates a diagnosis scenario by updating the troubleshooting DB 340 and stores the created diagnosis scenario. Since the diagnosis scenario is accumulated for various failure items as the service continues to proceed, the diagnosis scenario creation unit 365 updates the diagnosis scenario and transmits the updated diagnosis scenario to the smart device 200 at predetermined intervals. The predetermined intervals may be empirically determined depending on service operation.

The diagnosis information storage unit 215 of the smart device 200 may expand the types of failures that may be automatically resolved by the smart device 200 by receiving the updated diagnosis scenario from the maintenance service server 300 and updating the stored diagnosis scenario.

Figure 2:
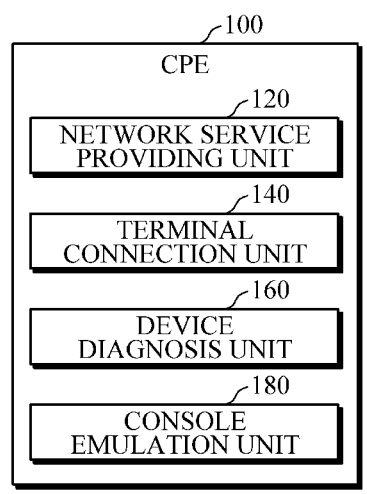
FIG. 2 is a block diagram showing a configuration of a customer-premises equipment (CPE) according to an embodiment.

FIG. 2 is a block diagram showing a configuration of a CPE according to an embodiment. As described above, a CPE 100 includes a network service provision unit 120 configured to provide an Internet service to a home device connected to a local area network (LAN); a terminal connection unit 140 connected to a smart device 200 of a customer through short-range wireless communication when a failure has occurred in a home Internet service and configured to enable the smart device 200 to diagnose a device and resolve a failure; a device diagnosis unit 160 configured to apply a diagnosis signal according to a diagnosis scenario stored in the smart device 200 or check an internal resource state; and a console emulation unit 180 configured to emulate a console connection when the console connection is remotely requested.

The network service provision unit 120, the terminal connection unit 140, the device diagnosis unit 160, and the console emulation unit 180, which are executed by the CPE 100, may be implemented with a computer-executable software program. As another aspect, the elements may be implemented as firmware. However, embodiments of the present invention are not limited thereto.

Figure 3:
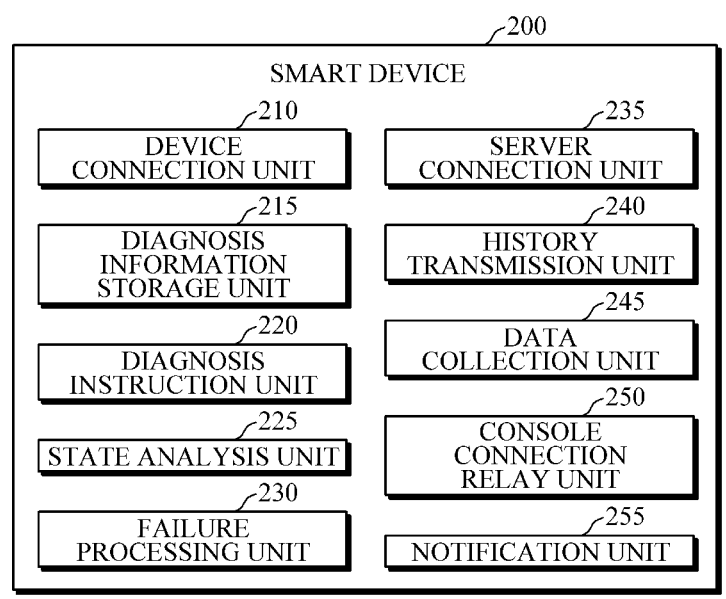
FIG. 3 is a block diagram showing a configuration of a smart device according to another embodiment.

FIG. 3 is a block diagram showing a configuration of a smart device according to another embodiment. As described above, a smart device 200 may correspond to a smartphone or a tablet computer connected to a mobile communication network. Accordingly, a description of a configuration of a general smartphone will be omitted, and only a configuration associated with a maintenance service will be shown.

Figure 4:
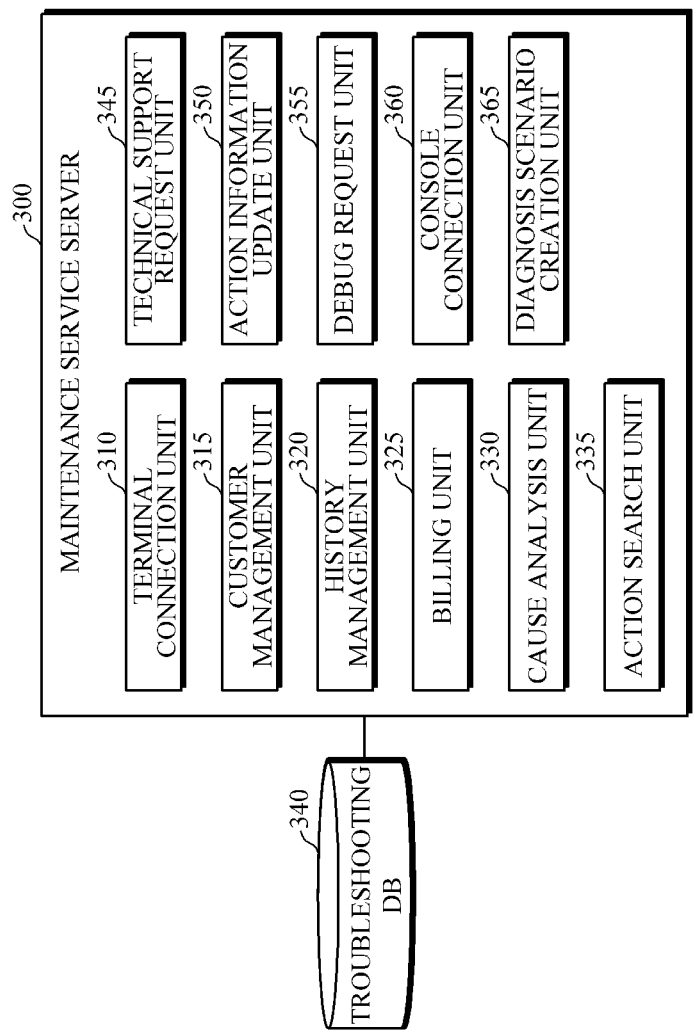
FIG. 4 is a block diagram showing a configuration of a maintenance service server according to still another embodiment.

As shown in FIG. 4, the smart device 200 includes a device connection unit 210 configured to connect to the CPE 100, a server connection unit 235 configured to connect to the maintenance service server 300, a diagnosis information storage unit 215 configured to store diagnosis scenarios by type of the CPE 100, a diagnosis instruction unit 220 configured to transmit diagnosis information according to the diagnosis scenario, a state analysis unit 225 configured to analyze state information collected as a diagnosis result and find a failure cause and action information, a failure processing unit 230 configured to order an action according to action information received from the maintenance service server 300, a history transmission unit 240 configured to transmit a failure history and a failure processing history, a data collection unit 245 configured to collect log information or the like, a console connection relay unit 250 configured to relay a remote console connection, and a notification unit 255 configured to issue a necessary notification.

The device connection unit 210, the server connection unit 235, the diagnosis information storage unit 215, the diagnosis instruction unit 220, the state analysis unit 225, the failure processing unit 230, the history transmission unit 240, the data collection unit 245, the console connection relay unit 250, and the notification unit 255, which are all executed by the smart device 200, are software programs running on a smart device such as a smartphone and a tablet computer and are provided in the form of an application. Also, the functional blocks may be implemented with a single application or a plurality of applications by grouping some functions.

FIG. 4 is a block diagram showing a configuration of a maintenance service server according to still another embodiment. As described above, a maintenance service server 300 includes a terminal connection unit 310 configured to connect to a smart device 200, a customer management unit 315 and a billing unit 325 configured to settle costs, a history management unit 320 configured to store a failure history and a failure processing history, a cause analysis unit 330 configured to analyze a failure cause from state information and device data, a troubleshooting DB 340 configured to store a failure cause and action information, an action search unit 335 configured to search for action information on the basis of an analyzed cause, a technical support request unit 345 configured to request a technical support from a maintenance specialist, a debug request unit 355 configured to request that a developer of the CPE 100 debug the CPE 100, a console connection unit 360 configured to remotely request a console connection, an action information update unit 350 configured to update the troubleshooting DB 340 with a failure cause and action information regarding a resolved failure, and a diagnosis scenario creation unit 365 configured to create a diagnosis scenario by updating the troubleshooting DB 340.

The terminal connection unit 310, the customer management unit 315, the billing unit 325, the history management unit 320, the cause analysis unit 330, the action search unit 335, the technical support request unit 345, the action information update unit 350, the console connection unit 360, and the diagnosis scenario creation unit 365, which are executed by the maintenance service server 300, are implemented with a computer-executable software program. Also, the functional blocks may be implemented with a single program or a plurality of programs by grouping some functions.

Figure 5:
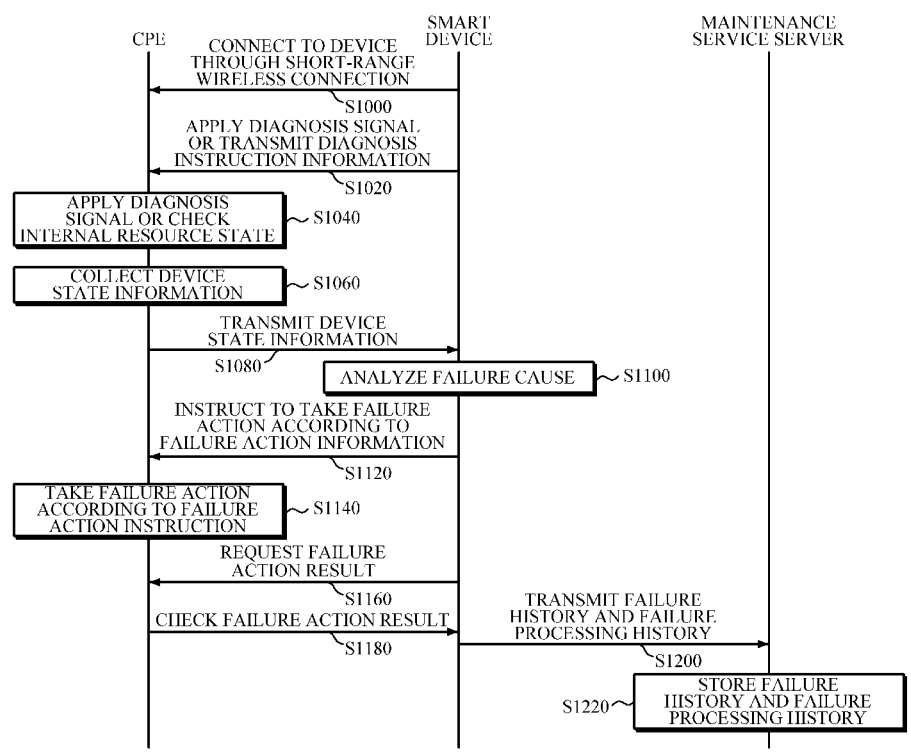
FIG. 5 is a diagram showing a process flow of a remote maintenance service method according to an embodiment.

FIG. 5 is a diagram showing a process flow of a remote maintenance service method according to an embodiment.

The remote maintenance service method according to an embodiment includes a device connection step of the smart device 200, a diagnosis instruction step of the smart device 200, a state information transmission step of the CPE 100, a state analysis step of the smart device 200, an action ordering step of the smart device 200, a history transmission step of the smart device 200, and a history management step of the maintenance service server 300.

In detail, in the device connection step of the smart device 200, the smart device 200 connects to the CPE 100 through short-range wireless communication. In the diagnosis instruction step of the smart device 200, the smart device 200 transmits sequential pieces of diagnosis instruction information according to a diagnosis scenario composed of the sequential pieces of diagnosis instruction information including an instruction to apply a diagnosis signal to a series of diagnosis items depending on the type of the CPE 100 or an instruction to collect state information regarding resources of the CPE 100.

Also, in the state information transmission step of the CPE 100, the CPE 100 applies a diagnosis signal according to diagnosis instruction information corresponding to a diagnosis scenario received from the smart device 200 to which the CPE 100 is connected or checks an internal resource state, collects state information, and transmits the collected state information.

Also, in the state analysis step of the smart device 200, the smart device 200 analyzes a failure cause by using the state information collected by the CPE 100. In the action ordering step of the smart device 200, the smart device 200 instructs the CPE 100 to take a failure action corresponding to the analyzed failure cause or a failure action according to failure action information received from the maintenance service server 300. In the history transmission step of the smart device 200, the smart device 200 transmits a failure history and a failure processing history to the maintenance service server 300.

Also, in the history management step of the maintenance service server 300, the maintenance service server 300 stores the received failure history and failure processing history to create billing information.

Specifically with reference to FIG. 5, when a failure has occurred in a home Internet service because of a failure having occurred in the CPE 100 or the like, a customer executes a maintenance service app of the smart device 200 to connect to the CPE 100 through short-range wireless communication (S1000).

After the device connection, the smart device 200 sequentially applies a diagnosis signal according to a diagnosis scenario stored by type of the CPE 100 or transmits diagnosis instruction information to the CPE 100 (S1020).

The CPE 100 applies a diagnosis signal according to the received information or diagnoses the device according to a diagnosis instruction, checks an internal resource state (S1040), and collects state information (S1060).

The CPE 100 transmits the collected state information to the smart device 200 (S1080).

The smart device 200 analyzes the received state information to find a failure cause (S1100) and instructs the CPE 100 to take a failure action according to failure action information corresponding to the found failure cause (S1120).

The CPE 100 resolves the failure by taking the failure action according to the received failure action instruction.

The CPE 100 may selectively request a result of the failure action (S1160), and the CPE 100 may check whether an Internet connection is normal or abnormal and transmit a failure action result indicating that the failure is resolved to the smart device 200 (S1180).

When the failure resolution is complete, the smart device 200 transmits a failure history and a failure processing history to the maintenance service server 300 (S1200).

The maintenance service server 300 stores the received failure history and failure processing history (S1220). Also, when cost settlement is needed, the maintenance service server 300 creates billing data based on the stored histories.

Figure 6:
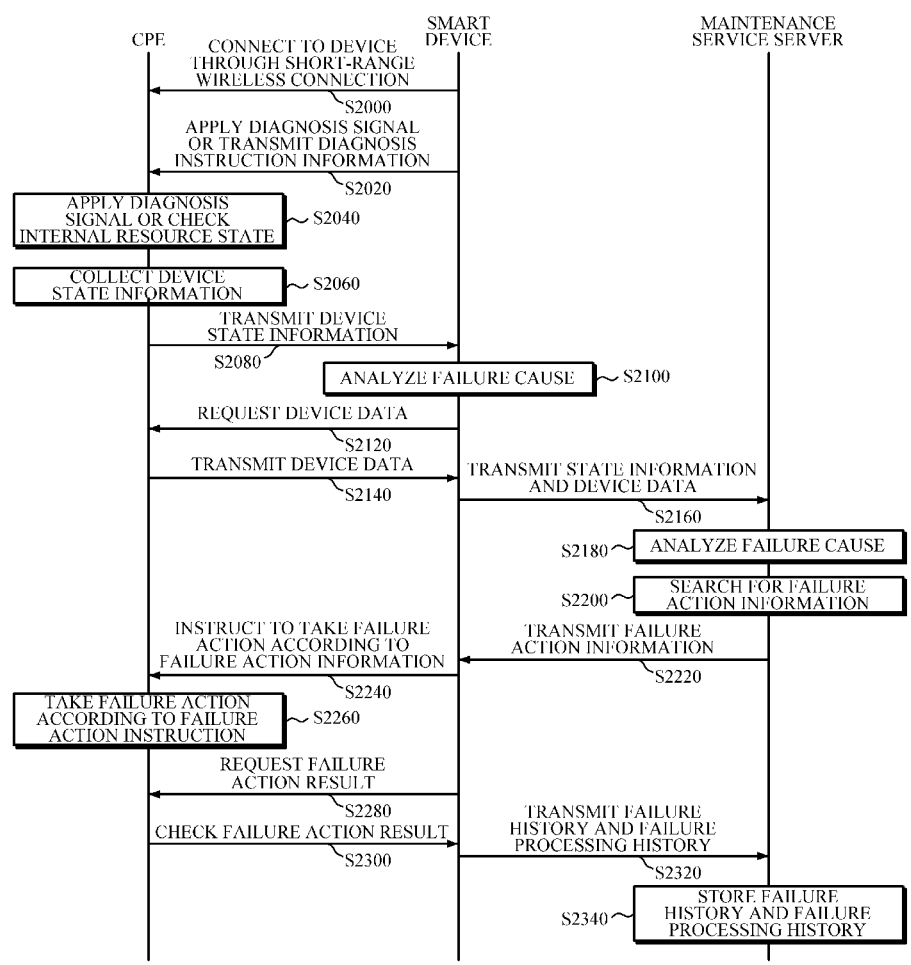
FIG. 6 is a diagram showing a process flow of a remote maintenance service method according to another embodiment.

FIG. 6 is a diagram showing a process flow of a remote maintenance service method according to another embodiment.

When a failure cause is not analyzed from the state information in the state analysis step of the smart device 200, the remote maintenance service method according to another embodiment may further include, before the action ordering step, a data collection step of the smart device 200, a data transmission step of the smart device 200, a cause analysis step of the maintenance service server 300, an action search step of the maintenance service server 300, and an action transmission step of the maintenance service server 300.

In detail, since the failure cause has not been analyzed from the state information in the state analysis step of the smart device 200, the failure cannot be automatically resolved by the smart device 200, and thus additional steps should be performed.

As the additional steps, in the data collection step of the smart device 200, the smart device 200 collects device data including at least log data and/or packet capture data of the CPE 100. The device data may further include network configuration information of the CPE 100 or the like.

Also, in the data transmission step of the smart device 200, the smart device 200 transmits the collected state information and device data to the maintenance service server 300 over a mobile communication network.

Also, in the cause analysis step of the maintenance service server 300, the maintenance service server 300 analyzes a failure cause from the received state information and device data.

Also, in the action search step of the maintenance service server 300, the maintenance service server 300 searches the troubleshooting DB 340 for failure action information by using the analyzed failure cause.

Also, in the action transmission step of the maintenance service server 300, the maintenance service server 300 transmits the failure action information to the smart device 200.

Also, in the action transmission step of the smart device 200, the smart device 200 transmits an action to the CPE 100 according to the failure action information received from the maintenance service server 300.

Specifically with reference to FIG. 6, when a failure has occurred in a home Internet service because of a failure having occurred in the CPE 100 or the like, a customer executes a maintenance service app of the smart device 200 to connect to the CPE 100 through short-range wireless communication (S2000).

After the device connection, the smart device 200 sequentially applies a diagnosis signal according to a diagnosis scenario stored by type of the CPE 100 or transmits diagnosis instruction information to the CPE 100 (S2020).

The CPE 100 applies a diagnosis signal according to the received information or diagnoses the device according to a diagnosis instruction, checks an internal resource state (S2040), and collects state information (S2060).

The CPE 100 transmits the collected state information to the smart device 200 (S2080).

The smart device 200 has analyzed the received state information, but does not find a failure cause (S2100). Accordingly, the smart device 200 requests device data including at least log information and/or packet capture information from the CPE 100 (S2120).

The CPE 100 transmits the device data including at least log information and/or packet capture information, which are stored therein, to the smart device 200 according to the request for the device data (S2140).

The smart device 200 transmits the received state information and device data to the maintenance service server 300 (S2160).

The maintenance service server 300 analyzes the received state information and device data to find a failure cause (S2180), searches the troubleshooting DB 340 for failure action information by using the analyzed failure cause (S2200), and transmits the failure action information to the smart device 200 (S2220).

The smart device 200 instructs the CPE 100 to take a failure action according to the received failure action information (S2240).

The CPE 100 resolves the failure by taking the failure action according to the received failure action instruction (S2260).

The CPE 100 may selectively request a result of the failure action (S2280), and the CPE 100 may check whether an Internet connection is normal or abnormal and transmit a failure action result indicating that the failure is resolved to the smart device 200 (S2300).

When the failure resolution is complete, the smart device 200 transmits a failure history and a failure processing history to the maintenance service server 300 (S2320).

The maintenance service server 300 stores the received failure history and failure processing history (S2340). Also, when cost settlement is needed, the maintenance service server 300 creates billing data based on the stored histories.

Figure 7:
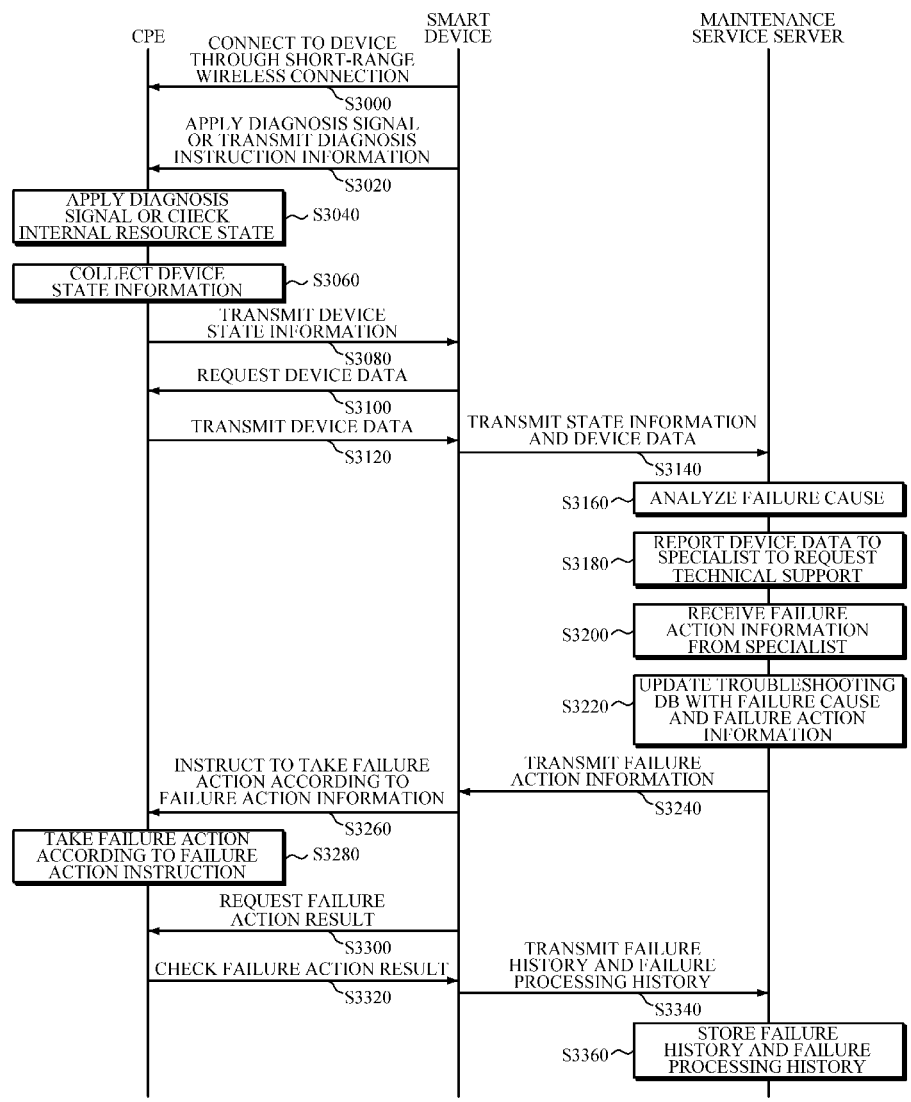
FIG. 7 is a diagram showing a process flow of a remote maintenance service method according to still another embodiment.

FIG. 7 is a diagram showing a process flow of a remote maintenance service method according to still another embodiment.

When the failure cannot be analyzed in the cause analysis step of the maintenance service server 300 or when the failure action information is not found in the action search step of the maintenance service server 300, the remote maintenance service method according to still another embodiment may further include, before the action transmission step, a technical support request step of the maintenance service server 300 and an action information update step of the maintenance service server 300.

In detail, since the failure cannot be analyzed in the cause analysis step of the maintenance service server 300 or the failure action information is not found in the action search step of the maintenance service server 300, the failure cannot be resolved only by searching the troubleshooting DB 340, and thus additional steps should be performed.

As the additional steps, in the technical support request step of the maintenance service server 300, the maintenance service server 300 reports the received state information and device data to a maintenance specialist and requests a technical support from the maintenance specialist.

In the action information update step of the maintenance service server 300, the maintenance service server 300 updates the troubleshooting DB 340 with the reported failure cause and the failure action information.

Specifically with reference to FIG. 7, when a failure has occurred in a home Internet service because of a failure having occurred in the CPE 100 or the like, a customer executes a maintenance service app of the smart device 200 to connect to the CPE 100 through short-range wireless communication (S3000).

After the device connection, the smart device 200 sequentially applies a diagnosis signal according to a diagnosis scenario stored by type of the CPE 100 or transmits diagnosis instruction information to the CPE 100 (S3020).

The CPE 100 applies a diagnosis signal according to the received information or diagnoses the device according to a diagnosis instruction, checks an internal resource state (S3040), and collects state information (S3060).

The CPE 100 transmits the collected state information to the smart device 200 (S3080).

The smart device 200 has analyzed the received state information, but does not find a failure cause. Accordingly, the smart device 200 requests device data including at least log information and/or packet capture information from the CPE 100 (S3100).

The CPE 100 transmits the device data including at least log information and/or packet capture information, which are stored therein, to the smart device 200 according to the request for the device data (S3120).

The smart device 200 transmits the received state information and device data to the maintenance service server 300 (S3140).

The maintenance service server 300 has analyzed the received state information and device data, but does not find a failure cause (S3160). Accordingly, the maintenance service server 300 reports the state information and device data to a maintenance specialist and requests a technical support (S3180).

The maintenance specialist analyzes the received state information and device data to find a failure cause, creates failure action information corresponding to the failure cause, and then sends the failure cause and the failure action information to the maintenance service server 300.

The maintenance service server 300 receives the failure cause and the failure action information from the maintenance specialist (S3200), updates the troubleshooting DB 340 with the received failure cause and the failure action information (S3220), and then transmits the failure action information to the smart device 200 (S3240).

The smart device 200 instructs the CPE 100 to take a failure action according to the received failure action information (S3260).

The CPE 100 resolves the failure by taking the failure action according to the received failure action instruction (S3280).

The CPE 100 may selectively request a result of the failure action (S3300), and the CPE 100 may check whether an Internet connection is normal or abnormal and transmit a failure action result indicating that the failure is resolved to the smart device 200 (S3320).

When the failure resolution is complete, the smart device 200 transmits a failure history and a failure processing history to the maintenance service server 300 (S3340).

The maintenance service server 300 stores the received failure history and failure processing history (S3360). Also, when cost settlement is needed, the maintenance service server 300 creates billing data based on the stored histories.

Figure 8:
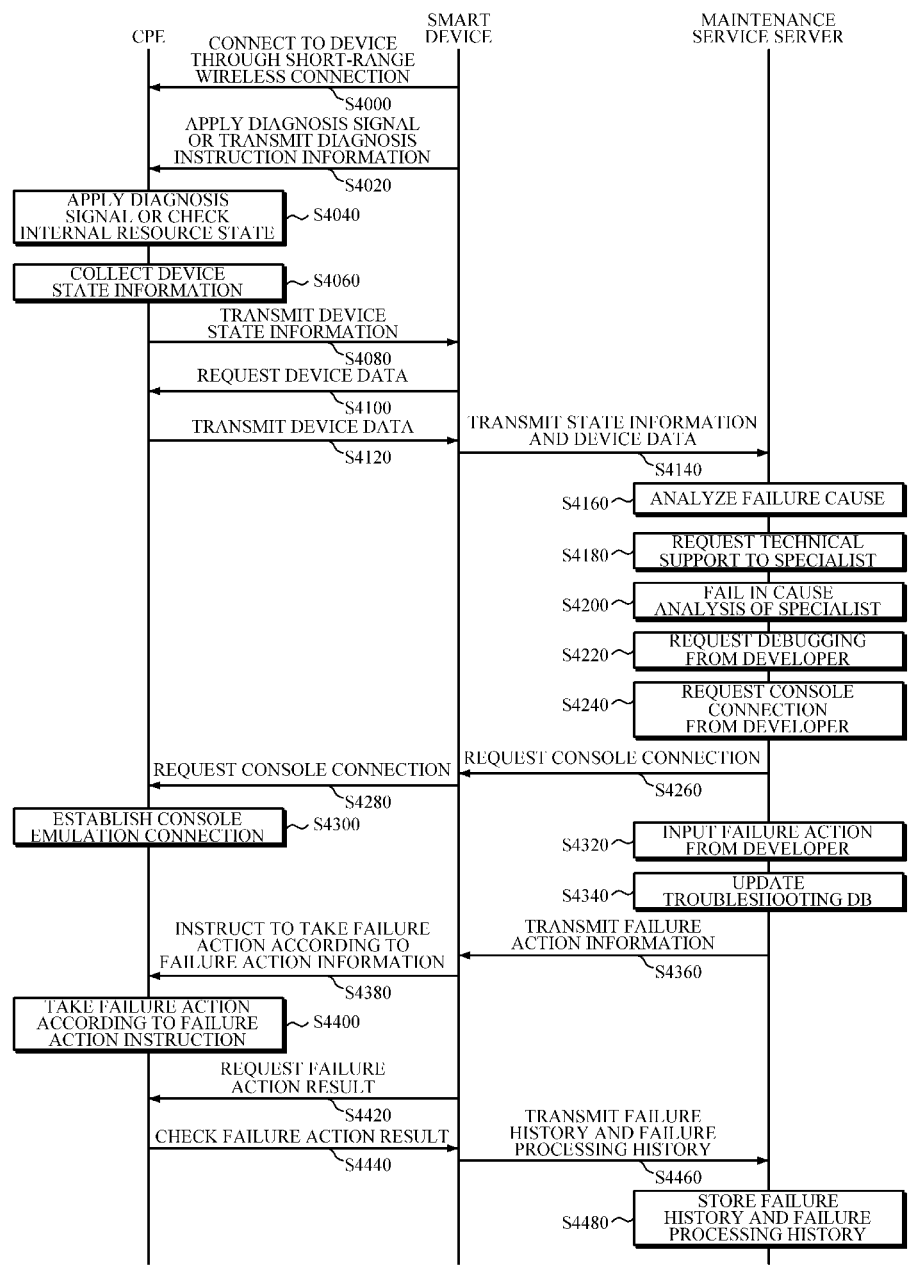
FIG. 8 is a diagram showing a process flow of a remote maintenance service method according to still another embodiment.

FIG. 8 is a diagram showing a process flow of a remote maintenance service method according to still another embodiment.

When the maintenance specialist does not analyze a failure cause, the remote maintenance service method according to still another embodiment may further include, before the action information update step, a debug request step of the maintenance service server 300, a console connection step of the maintenance service server 300, a console connection relay step of the smart device 200, and a console emulation step of the CPE 100.

In detail, since the maintenance specialist cannot analyze a failure cause, the failure cannot be resolved, and thus additional steps should be performed.

As the additional steps, in the debug request step of the maintenance service server 300, the maintenance service server 300 requests that a developer of the CPE 100 debug the CPE 100.

Also, in the console connection step of the maintenance service server 300, the maintenance service server 300 requests a console connection from the smart device 200 according to a received console connection request.

Also, in the console connection relay step of the smart device 200, the smart device 200 relays the console connection to the CPE 100 according to the received console connection request.

Also, in the console emulation step of the CPE 100, the CPE 100 remotely emulates the console connection and provides the emulated console connection to a console connection program at a remote site through the smart device 200.

Specifically with reference to FIG. 8, when a failure has occurred in a home Internet service because of a failure having occurred in the CPE 100 or the like, a customer executes a maintenance service app of the smart device 200 to connect to the CPE 100 through short-range wireless communication (S4000).

After the device connection, the smart device 200 sequentially applies a diagnosis signal according to a diagnosis scenario stored by type of the CPE 100 or transmits diagnosis instruction information to the CPE 100 (S4020).

The CPE 100 applies a diagnosis signal according to the received information or diagnoses the device according to a diagnosis instruction, checks an internal resource state (S4040), and collects state information (S4060).

The CPE 100 transmits the collected state information to the smart device 200 (S4080).

The smart device 200 has analyzed the received state information, but does not find a failure cause. Accordingly, the smart device 200 requests device data including at least log information and/or packet capture information from the CPE 100 (S4100).

The CPE 100 transmits the device data including at least log information and/or packet capture information, which are stored therein, to the smart device 200 according to the request for the device data (S4120).

The smart device 200 transmits the received state information and device data to the maintenance service server 300 (S4140).

The maintenance service server 300 has analyzed the received state information and device data, but does not find a failure cause (S4160). Accordingly, the maintenance service server 300 reports the state information and device data to a maintenance specialist and requests a technical support (S4180).

The maintenance specialist has analyzed the received state information and device data, but does not find a failure cause (S4200). Accordingly, the maintenance service server 300 transmits the state information and device data to a developer of the CPE 100 to request that the developer debug the CPE 100 (S4220).

The developer analyzes the received state information and device data. If necessary, the developer requests a console connection from the maintenance service server 300 (S4240).

The maintenance service server 300 requests a console connection from the smart device 200 according to the received console connection request (S4260).

The smart device 200 requests a console connection from the CPE 100 according to the received console connection request and relays the console connection (S4280).

The CPE 100 emulates the console connection as if actually connected to a console port and, according to the received remote console connection request, establishes the connection (S4300).

The developer debugs the CPE 100 through a remotely connected console, analyzes a failure cause, creates action information, and transmits the failure cause and the action information to the maintenance service server 300 (S4320).

The maintenance service server 300 updates the troubleshooting DB 340 with the received failure cause and action information (S4340) and transmits failure action information to the smart device 200 (S4360).

The smart device 200 instructs the CPE 100 to take a failure action according to the received failure action information (S4380).

The CPE 100 resolves the failure by taking the failure action according to the received failure action instruction.

The CPE 100 may selectively request a result of the failure action (S4420), and the CPE 100 may check whether an Internet connection is normal or abnormal and transmit a failure action result indicating that the failure is resolved to the smart device 200 (S4440).

When the failure resolution is complete, the smart device 200 transmits a failure history and a failure processing history to the maintenance service server 300 (S4460).

The maintenance service server 300 stores the received failure history and failure processing history (S4480). Also, when cost settlement is needed, the maintenance service server 300 creates billing based on the stored histories.

The present invention provides a solution capable of directly diagnosing and resolving a failure having occurred in a CPE by utilizing an application installed on a customer's smartphone when the failure is resolved by a simple action.

Furthermore, the present invention provides a solution capable of remotely resolving a failure having occurred in a CPE without an onsite visit of a maintenance specialist by providing a means for remotely resolving the failure over a reliable mobile communication network.

Furthermore, the present invention provides a solution capable of facilitating cost settlement by collecting a failure history and a failure processing history on a customer basis and thus finding a failure occurrence history and a processing statement.

While the embodiments of the present invention have been described with reference to the accompanying drawings, but are not limited thereto, it will be appreciated by those skilled in the art that various modifications may be obviously made to the embodiments. The appended claims are intended to cover such modifications.

What is claimed is:

1. A remote maintenance system using a mobile communication network, the remote maintenance system comprising:
   a customer-premises equipment (CPE);
   a smart device connected to the CPE through short-range wireless communication; and
   a maintenance service server configured to communicate with the smart device,
   wherein the CPE comprises:
      a network service provision unit connected to a service of an Internet service provider and configured to provide a home Internet service;
      a terminal connection unit configured to connect to the smart device through short-range wireless communication;
      a device diagnosis unit configured to apply a diagnosis signal or check an internal resource state depending on diagnosis instruction information according to a diagnosis scenario received from the smart device; and
      a console emulation unit configured to remotely provide a console connection to a console connection program at a remote site through the smart device, wherein the smart device comprises:
  a memory configured to store an application, the application comprising:
    a device connection unit configured to connect to the CPE through short-range wireless communication;
    a diagnosis information storage unit configured to store a diagnosis scenario composed of sequential pieces of diagnosis instruction information including an instruction to apply a diagnosis signal for a series of diagnosis items depending on a type of the CPE or an instruction to collect state information regarding resources of the CPE;
    a diagnosis instruction unit configured to transmit the sequential pieces of diagnosis instruction information to the device diagnosis unit according to a diagnosis scenario corresponding to the CPE;
    a state analysis unit configured to analyze a failure cause by using the state information collected from the CPE;
    a failure processing unit configured to order a failure action corresponding to the failure cause;
    a server connection unit configured to connect to the maintenance service server over a mobile communication network; and
    a history transmission unit configured to transmit a failure history and a failure processing history to the maintenance service server; and
  a processor configured to execute the application,
wherein the maintenance service server comprises:
  a terminal connection unit configured to connect to the smart device;
  a customer management unit configured to manage customer information including subscribed Internet service provider information and provided information regarding the CPE;
  a history management unit configured to store and manage a failure history and a failure processing history received from the smart device on a customer-basis; and
  a billing unit configured to calculate a cost according to the failure processing history,
wherein, when the CPE has a failure, the smart device is further configured to analyze state information collected according to a diagnosis scenario, process the failure, and transmit a failure processing history to the maintenance service server,
wherein the short-range wireless communication is different from the home Internet service;
wherein the application further comprises a data collection unit configured to collect device data including either one or both of log information and packet capture information from the CPE when a failure cause cannot be analyzed by the state analysis unit, and
wherein the maintenance service server further comprises:
a troubleshooting database (DB) configured to store a failure cause and failure action information corresponding to the failure cause, a cause analysis unit configured to analyze the failure cause by using received device data, and an action search unit configured to search the troubleshooting DB for the failure action information by using the analyzed failure cause; and the failure processing unit of the smart device is further configured to receive the failure action information from the maintenance service server, and instruct the CPE to take a failure action according to the failure action information.

2. The remote maintenance system of claim 1, wherein, for transmitting the failure action information to the smart device, the maintenance service server further comprises:
  a technical support request unit configured to report the received device data to a maintenance specialist when the cause analysis unit is unable to analyze a failure cause or when failure action information corresponding to the analyzed failure cause is not found from the troubleshooting DB; and
  an action information update unit configured to receive the analyzed failure cause and the failure action information and update the troubleshooting DB with the received failure cause and failure action information.

3. The remote maintenance system of claim 2, wherein:
  the application further comprises a console connection relay unit configured to relay a console connection with the CPE when the console connection is requested from a console connection program at a remote site; and
  for the transmitting of the failure action information to the smart device, the maintenance service server further comprises:
    a debug request unit configured to deliver the received device data to a developer of the CPE and request that the developer debug the CPE when the failure is not resolved by the maintenance specialist; and
    a console connection unit configured to request a console connection from the smart device according to a console connection request from the developer.

4. The remote maintenance system of claim 3, wherein the application further comprises a notification unit configured to display a notification message indicating that a remote console connection is being made when the console connection is relayed to the CPE.

5. The remote maintenance system of claim 1, wherein:
  the maintenance service server further comprises a diagnosis scenario creation unit configured to create a diagnosis scenario by updating the troubleshooting DB, and store the created diagnosis scenario; and
  the diagnosis information storage unit is further configured to receive the updated diagnosis scenario from the maintenance service server, and update a prestored diagnosis scenario using the received diagnosis scenario.

6. A remote maintenance method of a customer-premises equipment (CPE) using a mobile communication network, the remote maintenance method comprising:
  connecting a smart device to the CPE through short-range wireless communication;
  transmitting, by the smart device, sequential pieces of diagnosis instruction information according to a diagnosis scenario composed of the sequential pieces of diagnosis instruction information, including an instruction to apply a diagnosis signal for a series of diagnosis items depending on a type of the CPE or an instruction to collect information regarding resources of the CPE;
  applying, by the CPE, a diagnosis signal or checking, by the CPE, an internal resource state depending on the diagnosis instruction information,
  collecting, by the CPE, state information,
  transmitting, by the CPE, the collected state information;
  analyzing, by the smart device, a failure cause by using the collected state information;
  instructing, by the smart device, the CPE to take a failure action corresponding to the analyzed failure cause or instructing, by the smart device, the CPE to take a failure action according to failure action information received from a maintenance service server;

transmitting, by the smart device, a failure history and a failure processing history to the maintenance service server; and storing, by the maintenance server, the failure history and the failure processing history to create billing information, wherein the short-range wireless communication is different from a home Internet service provided by the CPE; and wherein a failure cause is not able to be analyzed from the state information, the method further comprising:

collecting, by the smart device, device data including either one or both of log data and packet capture data of the CPE;

transmitting, by the smart device, the collected state information and device data to the maintenance service server over a mobile communication network;

analyzing, by the maintenance service server, a failure cause from the received state information and device data;

searching, by the maintenance server, a troubleshooting database (DB) for failure action information by using the analyzed failure cause, and transmitting, by the maintenance service server, the failure action information to the smart device.

7. The remote maintenance method of claim 6, further comprising, when a failure cause is not able to be analyzed or when failure action information is not found:

reporting, by the maintenance service server, the received state information and device data to a maintenance specialist to request technical support; and updating, by the maintenance service server, the troubleshooting DB with the reported failure cause and the failure action information.

8. The remote maintenance method of claim 7, further comprising when a failure cause is not able to be analyzed by the maintenance specialist:

requesting, by the maintenance service server, that a developer of the CPE debug the CPE;

requesting, by the maintenance service server, a console connection from the smart device according to a received console connection request;

relaying, by the smart device, a console connection to the CPE according to a received console connection request; and emulating, by the CPE, the console connection and remotely providing, by the CPE, the emulated console connection to a console connection program at a remote site through the smart device.

* * * * *